(12) United States Patent
Beasley

(10) Patent No.: US 6,240,946 B1
(45) Date of Patent: Jun. 5, 2001

(54) SWITCH VALVE

(75) Inventor: Marvin E. Beasley, Houston, TX (US)

(73) Assignee: Tyco Flow Control, Inc., Houston, TX (US)

( * ) Notice: Subject to any disclaimer, the term of this patent is extended or adjusted under 35 U.S.C. 154(b) by 0 days.

(21) Appl. No.: 09/154,905

(22) Filed: Sep. 17, 1998

(51) Int. Cl.[7] ............................ F16K 5/20; F16K 11/087; B08B 3/04; B08B 9/032

(52) U.S. Cl. .................... 137/15.06; 137/15.07; 137/240; 137/242; 137/625.46; 251/185; 251/314; 251/315.13; 251/368

(58) Field of Search ........................ 137/15.06, 238, 137/240, 241, 242, 375, 625.46, 625.47, 15.07, 15.22; 251/174, 176, 180, 185, 315.02, 315.03, 315.05, 315.1, 315.12, 315.13, 368, 314

(56) References Cited

U.S. PATENT DOCUMENTS

| | | | |
|---|---|---|---|
| 967,460 | * | 8/1910 | Straub .................... 137/242 |
| 2,315,058 | * | 3/1943 | Holt, 2D et al. .......... 137/242 |
| 3,591,134 | * | 7/1971 | Fujiwara ................. 251/185 |
| 4,020,864 | * | 5/1977 | Church, Jr. .............. 137/242 |
| 4,429,717 | * | 2/1984 | Montgomery ............ 137/242 |
| 4,479,513 | * | 10/1984 | Koch et al. ............ 137/625.47 |
| 4,552,334 | * | 11/1985 | Tomiyama et al. ........ 137/240 |
| 4,887,794 | * | 12/1989 | Oliver et al. ............ 251/185 |
| 4,911,409 | * | 3/1990 | Oliver et al. .......... 251/315.03 |
| 5,313,976 | | 5/1994 | Beasley .................. 137/15 |
| 5,588,638 | * | 12/1996 | Bunting ............... 251/315.05 |

OTHER PUBLICATIONS

"Advances in Coatings and Paintings," Valve Magazine, Fall 1994/vol. 6, No. 4.
Brochure "Valvtron", 2 pages.

* cited by examiner

Primary Examiner—George L. Walton
(74) Attorney, Agent, or Firm—Browning Bushman

(57) ABSTRACT

A switch valve 10 is provided with an upper body 14 having a plurality of outlet ports 20A, 20B, and 20C and a lower body housing 16 with inlet port 18. The switch valve includes a ball member 22 which is rotatable within the switch valve body 12 for selective fluid communication between the inlet port 18 and the selected one of the plurality of outlet ports. The ball 22 is rotated by a stem 28, which may be powered by an actuator unit. The upper body 14 includes a substantially dome-shaped seating surface 40 for sealing engagement with the outer surface 38 of the ball. The biasing member 48 biases the ball radially in a direction opposite the ball inlet port 24 to obtain the desired sealing engagement. The biasing member is preferably a Belleville spring 48 having a single wrap design.

19 Claims, 2 Drawing Sheets

SWITCH VALUE

FIELD OF THE INVENTION

The present invention relates to switch valves of the type commonly used to divert incoming fluid to a selective one of a plurality of fluid outlets from the valve. More particularly, this invention relates to a highly reliable switch valve suitable for severe service applications.

BACKGROUND OF THE INVENTION

Switch valves have been used for decades in various industrial applications to divert an upstream fluid to one of a plurality of downstream lines extending from the switch valve. Conventional switch valves have generally utilized one of two basic designs: (1) a plug valve element design, or (2) a ball valve element with bellows design.

Switch valves utilizing plug element have not proven to be highly reliable, particularly when the valves are used in severe service automated applications. When the plug element is lifted and rotated to operate the valve, particulate matter frequently becomes trapped between the plug element and the seat, which may damage the seat and thus increase the likelihood of leakage. A typical ported plug valve cannot handle the full flow of the pipe to which it is connected, and is difficult to automate. Accordingly, ball element switch valves are generally preferred over plug element switch valves when used in severe service automated applications. A common severe service application for a switch valve is a coker operation, wherein hydrocarbon is diverted by the switch valve from an upstream source to one of a plurality of downstream lines. Those skilled in the art appreciate that this type of service for a valve requires high reliability since coke formed from the hydrocarbon tends to foul moveable components within the valve. Other types of severe service applications will be apparent to those skilled in the art.

A significant problem with prior art switch valves of the ball variety with bellows relates to the complexity of the valve. Such valves commonly have as many as sixteen internal parts, including a ball assembly and a seat, sleeve, bellows, insert gasket, and insert associated with each of the plurality of outlets. Each bellows seals between the valve body and a respective seat, and biases the seat for sealing engagement with the ball. The large number of parts increases the likelihood of valve failure due to a failure of one or more of these parts. This valve design utilizes a separate bellows loading a seat adjacent to each of the outlets to balance and centralize the ball in the center of the valve body. The bellows assembly conventionally includes a weld between the bellows and the seat, and this assembly depends upon a balanced purge to prevent the bellows from being damaged by system over pressure. If the valve loses purge pressure, the bellows may be distorted and the valve permanently damaged.

Other problems with prior art switch valves of the ball variety relate to the high costs to maintain the valve. To disassemble a conventional switch valve with a ball and multiple bellows, the weld from the sleeve to the bellows must be cut and a new sleeve welded in place. Since various severe service applications commonly use chrome-moly materials for these components, this welding operation is difficult and requires stress relieving to minimize the likelihood of cracking. Moreover, the use of an extremely thin material for the bellows assembly is required, and care must be taken in selecting a material with high tensile and yield properties. The bellows assembly materials are thus expensive, and the thin materials could limit valve testing and full service rating in actual service.

Still another problem with conventional switch valves utilizing a ball element and multiple bellows is that the bellows design allows for the accumulation of material passing through the valve to build up and adversely affect the valve operation. In view of the high number of areas where buildup may occur, a large number of purge ports are provided in conventional ball-type switch valves. A good deal of time and expense is thus required to minimize buildup of solid matter in these areas.

When the ball port of a prior art switch valve moves during rotation of the stem to divert fluid from one outlet to another outlet, the cavity around the ball is exposed to the process stream. In addition, the cavity purge exhausts with the full bore of the ball as the ball rotates, thereby allowing unrestricted flow and high consumption of the steam purge. This loss of steam is costly and the ingress of process material could lead to valve lockup, both of which are significant problems for this type of design.

Those skilled in the art recognize that switch valves having at least two and often three outlet ports present unique problems with respect to their design and operation compared to conventional shut-off or control valves having a single inlet port and a single outlet port. The disadvantages of the prior art are overcome by the present invention, and an improved switch valve utilizing a ball element is hereinafter disclosed. The switch valve of this invention is highly reliable, and is particularly well suited for severe service applications.

SUMMARY OF THE INVENTION

An improved switch valve having a ball member is suitable for severe service applications. In a preferred embodiment, the ball member directs incoming fluid to a selected one of a plurality of outlets, with the ball member being rotatable within the valve body by a valve stem for controlling fluid communication between the body inlet port and the selected one of the plurality of body outlet ports. A suitable actuator is recommended for powering rotation of the valve stem. A valve body defines a valve seat thereon integral with the valve body and spaced circumferentially about each of the plurality of outlet ports. A Belleville spring or other biasing member provided adjacent the body inlet port exerts a biasing force on the ball member for sealing engagement with the valve seat.

It is an object of the present invention to provide an improved switch valve which benefits by a design which is simplistic and has few moving parts. The valve employs a seat which is integral with the valve body to provide a rigid seating surface with few if any behind-the-seat cavities. A Belleville spring or other biasing member biases the ball for continuous sealing engagement with the seating surface, with the biasing member being positioned circumferentially about the fluid inlet port of the valve.

It is a feature of the present invention that the ball valve may utilize outlet ports which each having a central axis angled at from 125° to 155° relative to a central axis of the body inlet port, thereby improving flow capacity compared to conventional ball valves which utilize a 90° angle between the inlet port and each of the outlet ports. This design improves the performance of the valve by reducing the pressure drop through the valve under flowing conditions. By providing a single biasing member rather than a plurality of biasing members each associated with a respective outlet port, the biasing member material may be increased in thickness, thereby allowing the biasing member to be manufactured from more conventional rather than expensive materials. In one embodiment, the switch valve is provided with a ball having a diameter only twice the diameter of each of three outlet ports from the valve body. By utilizing a ball-type switch valve which does not include a bellows, the reliability of the valve is increased. The switch valve of the present invention also reduces the number of cavities within the valve where debris may accumulate compared to a conventional switch valve with bellows, thereby reducing the purging operations required, to allow reliable valve operation. The valve seat formed on the valve body may exert a cleaning force against the ball as it rotates within the valve body to remove debris from the surface of the ball. By providing an integral seat on the valve body, the possibility of damaging the valve during testing or from full service rating in actual service is substantially eliminated.

A significant advantage of the present invention is that the switch valve may be reliably used in severe service applications, such as those involved in a coking service. The design of the valve is such that the coke or other solid contaminants carried by the fluid passing through the valve does not tend to build up within the valve cavity. During rotation of the ball, the cavity around the ball is never exposed to the process, thereby preventing process ingress. This allows the purge steam to be contained and thus not exhausted into the flow bore, thereby conserving consumption of the purging fluid.

These and further objects, features, and advantages of the present invention will become apparent from the following detailed description, wherein reference is made to the figures in the accompanying drawings.

DETAILED DESCRIPTION OF PREFERRED EMBODIMENTS

Figure 1:
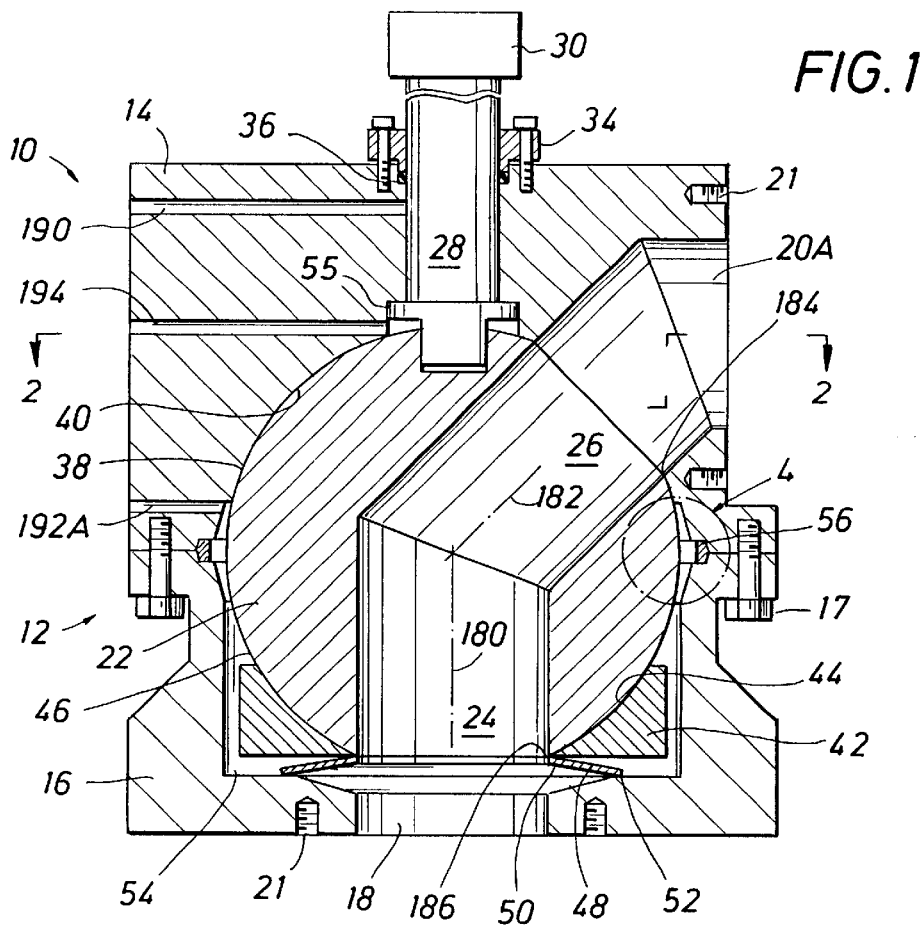
FIG. 1 is a cross-sectional side view illustrating a switch valve in accordance with the present invention.

FIG. 1 depicts in cross-section a switch valve 10 according to the present invention. The primary components of the switch valve include a body 12 comprising an upper housing 14 and a lower housing 16. The upper and lower housings are conventionally secured together by a plurality of circumferentially spaced bolts 17. The lower housing has an inlet port 18 and the upper housing has three outlet ports 20A, 20B and 20C. Those skilled in the art recognize that a switch valve may have a plurality of outlet ports. While the embodiment discussed herein is depicted with three outlet ports, the switch valve could also have more or less than three outlet ports. According to the present invention, three ports 20A, 20B, and 20C may be provided in the upper housing, with these ports being circumferentially spaced 120° apart. Those skilled in the art will appreciate that the terms "upper" and "lower" are merely for convenience of explanation and are not a limitation on the invention. The terms "lower housing" and "upper housing" could also be called "inlet housing" and "outlet housing," respectively.

A switch valve ball 22 has an inlet port 24 and an outlet port 26, with the ball outlet port 26 shown in FIG. 1 being in fluid communication with the body outlet port 20A. The ball 22 thus diverts fluid between the inlet port and a selected one of the three outlet ports 20A, 20B or 20C, depending on the rotational position of the ball 22 within the body 12. The ball is rotated by a suitable stem 28, which in a preferred embodiment is powered by a conventional actuator unit 30. The stem 28 is spaced radially opposite the center of the ball from the ball inlet port 24. The present invention is well suited to obtain benefits from a switch valve with a powered actuator unit. The concepts of the invention, as discussed below, may allow the size of the actuator unit 30 to be reduced compared to many prior art switch valves, particularly since the required safety factor for sizing the actuator may be reduced in view of the reduced likelihood of contaminant buildup within the valve. The stem 28 is sealed to the upper housing 14 by a conventional packing gland with a gland flange 34 and sealing members 36 for sealing between the rotational stem 28 and the upper housing 14 when the ball 22 is rotated to divert fluid from one outlet port to another outlet port in accordance with the present invention. The sealing members 36 may comprise a plurality of lantern rings and anti-extrusion rings spaced between a Grafoil™ material. The switch valve of the present invention may include one or more leak detector ports 190 in the upper housing for detecting any leakage past the sealing members 36. Such leak detector ports allow for easy detection to determine when the sealing members 36 should be replaced, and may also be used for injecting a purging fluid, as discussed below.

Figure 3:
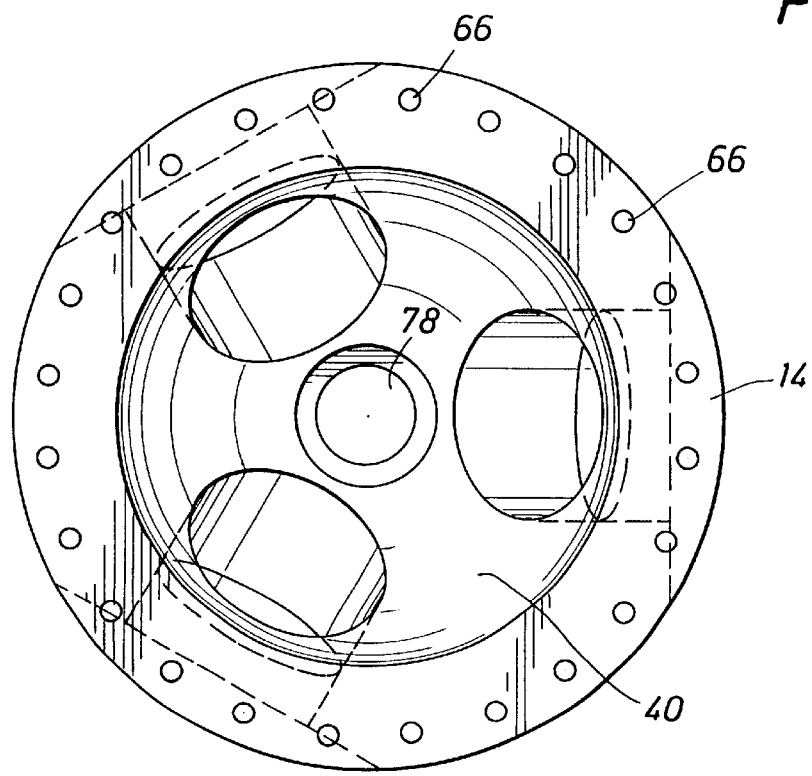
FIG. 3 is a bottom view of the upper housing of the switch valve body.

According to the present invention, the outer surface 38 of the ball 22 which is radially opposite the inlet port 24 is provided for mating engagement with the generally dome-shaped upper surface 40 of the upper housing 14. As shown in FIG. 3, there is substantial area contact intentionally provided between the ball outer sealing surface 38 and the upper housing seating surface 40. The ball 22 is forced in a direction radially opposite the inlet port 24 by an annular guide member 42 which has an upper surface 44 for mating engagement with the radially lower portion 46 of the ball spaced radially opposite the upper surface 40 of a ball. The centering or guide member 42 is biased towards the surface 46 by a biasing member 48, which is preferably a Belleville spring, and ideally a single wrap or washer type Belleville spring having an annular upper surface 50 for engaging the lower surface of the guide member 42 and a lower annular surface 52 for mating engagement with the lower housing 16. The biasing member 48 thus directs force in a line of action which passes between a center of the body inlet port 18 and the center of the ball and toward the upper surface of the ball radially opposite the inlet port 24. The upper surface 50 of the Belleville spring 48 provides substantially a metal seating surface with the ball, while the lower surface 52 provides the same function by substantially sealing with the lower housing 16. Those skilled in the art will thus appreciate that the cavity 54 is substantially sealed at its lower end from the fluid passing between ports 18 and 24 by the Belleville spring 48 and guide member 42.

According to one embodiment of the invention, the switch valve 10 transmits a fluid which has contaminants which tend to adversely affect the operation of a switch valve. In an exemplary application wherein a switch valve transmits fluid for a coking operation, coke tends to become lodged in ports in the switch valve and adversely affects its operation. Some coke material might possibly enter the cavity 54 by passing upward past the Belleville spring 48, although this significantly reduced amount of material and the design of the invention reduce the adverse affect of coke in the cavity 54 compared to prior art switch valves. Steam injection lines are also ideally provided for injecting steam tangentially into the annular cavity 54, as discussed below.

Figure 2:
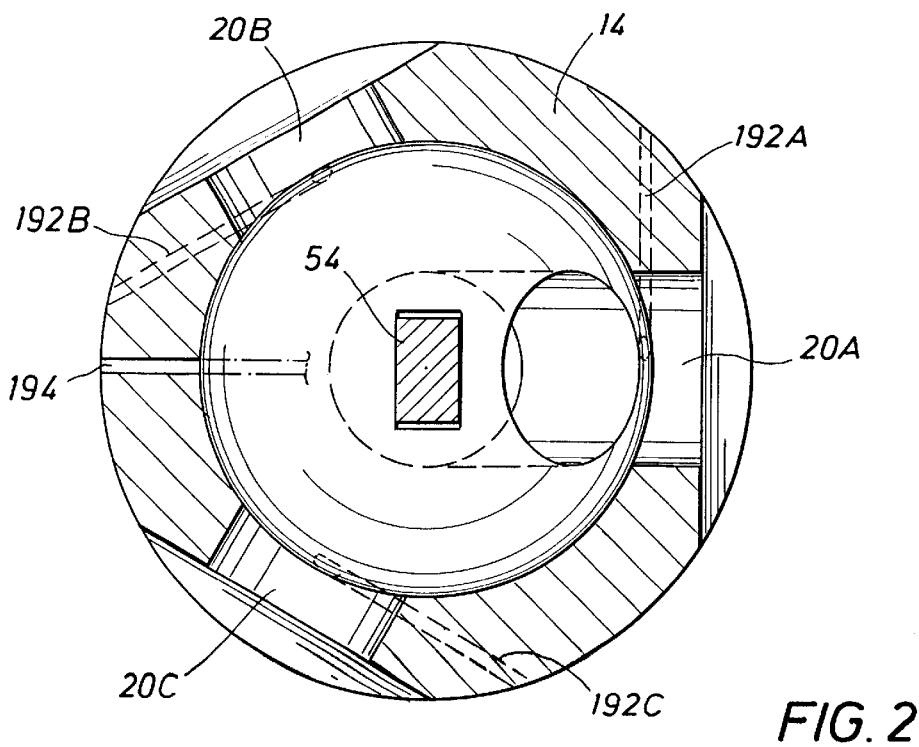
FIG. 2 is a cross-sectional view generally through the switch valve at the location shown in FIG. 1, but with the cross-section modified to follow the contour of the seating surface.

FIG. 2 is generally a cross-sectional view through the switch valve at a position shown in FIG. 1, although the cross-section is modified to better understand the structure of the switch valve. Accordingly, the FIG. 2 cross-section starts on the right side through the center of outlet port 20A, then drops downward and then follows the contour of the seating surface 40, then upward the out the left side through stem purge line 194 discussed below. The stem 28 has a lower end 54 with a non-cylindrical surface, and in this case has a rectangular-shape cross-section for mating engagement with a similar aperture in the ball 22 for rotationally interconnecting the ball 22 and the stem 28. The upward force provided by the Belleville spring 48 is absorbed by the upper seating surface 40 of the housing 14. The seating surface 40 is thus designed to resist all upward forces acting on the ball 22, whether those forces are the result of the spring 48 or fluid pressure in the ball. The stem 28 includes a flange member 55 which resists the pressure force on the stem, holding the stem in the body member 14 so that the stem is not blown out by fluid pressure in the valve.

Figure 4:
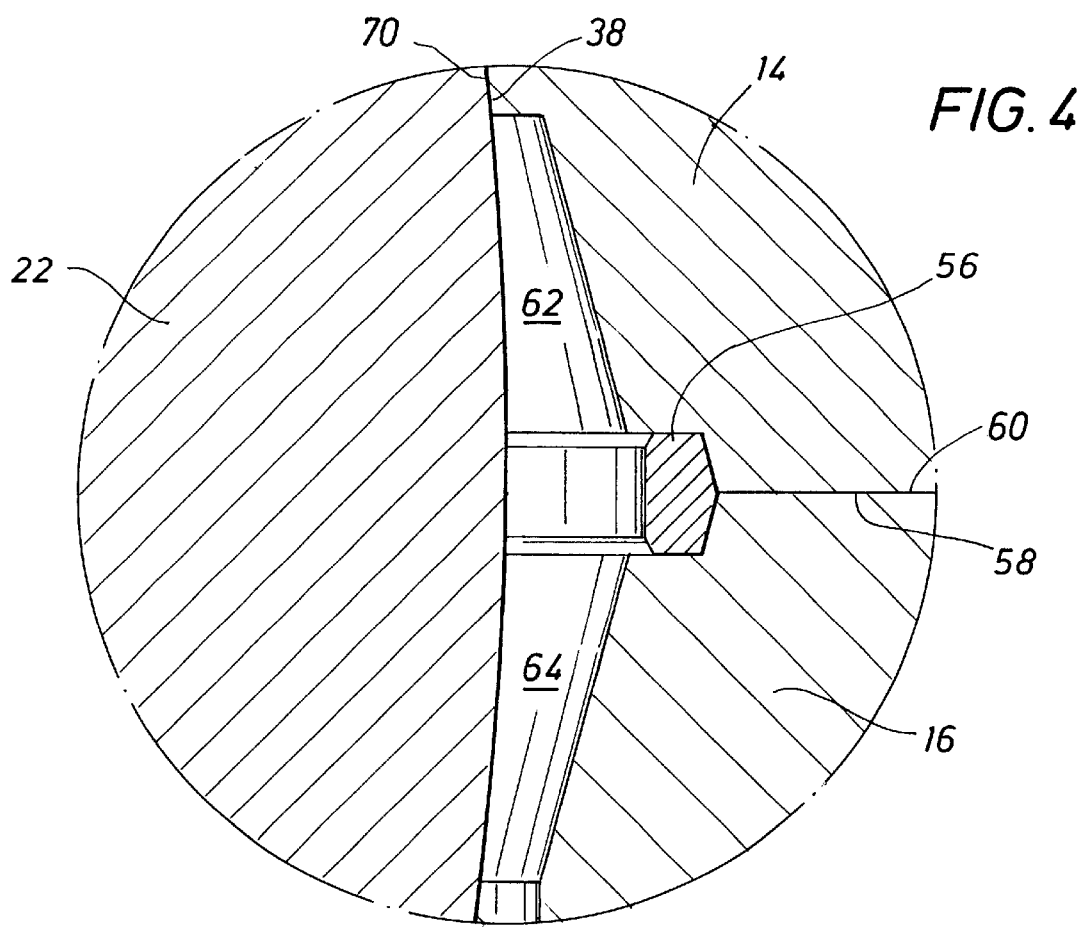
FIG. 4 is a detailed view of a suitable mechanism for sealing between the upper and lower switch valve housings.

FIG. 4 depicts the sealing member 56 as shown in FIG. 1. The member 56 is intended for sealing between the lower surface 58 of the upper housing 14 and the upper surface 60 of the lower housing 16. The seal 56 is thus intended to provide a seal for preventing fluids flowing through the switch valve from passing between the flanges defined by surfaces 58 and 60, which as previously explained may be secured together by the bolts 17. The seal 56 is not intended to seal between the upper annular cavity 62 and the lower annular cavity 64, since contaminants are prevented from passing "downward" into the cavity 62 by the ring-shaped lower end surface 70 of the seating surface 40.of the upper housing 14, which is in sealing engagement with the outer surface 38 of the ball 22. As shown in FIG. 1, the lower annular cavity 64 is in fluid communication with the cavity 54 discussed above. FIG. 3 depicts circumferentially spaced threaded ports 66 each provided for receiving respective one of the bolts 17 shown in FIG. 1 to secure the upper housing to the lower housing.

Referring again to FIG. 1, both the upper housing 14 and the lower housing 16 may be provided with a plurality of circumferentially spaced threaded holes 21. These threaded bolt holes are provided for receiving securing members from an end of a suitable flow line (not shown) which may be connected to each of the three outlet ports of the upper housing 14, namely 20A, 20B, or 20C, and may be similarly connected to the inlet port 18 of the lower housing 16. Various conventional mechanisms are known to those skilled in the art for securing the ends of flow lines to upper and lower housings of a switch valve, and the particular type of securing member selected and the type of sealing members for sealing between a respective flow line and the body 12 are not particularly significant to the concepts of the present invention.

A particular feature of the invention is the simplicity obtained by the design of the switch valve. The switch valve 10 of the present invention has very few internal parts compared to prior art switch valves. The switch valve assembly also does not include a bellows assembly which frequently is provided in prior art switch valves to provide the desired sealing engagement within the ball. A seal between the outer surface 38 of the ball 22 and the large surface area of the dome-shaped upper surface 40 of the upper housing 14 is obtained as a result of the biasing force provided by a single Belleville spring 48. Numerous parts are thus not required by the design of the switch valve according to the present invention to accomplish a reliable seal about each of the body outlet ports. By providing a large area seating surface, multiple cavities within the interior of the valve which tend to build up with coke particles are minimized. Preferably the entirety of the upper portion of the ball 22 radially opposite the inlet port 24, i.e., with the exception of the plurality of outlet ports from the upper housing, the remaining portion spaced between the ring-shaped portion 70 above the seal 56 and the top of the ball 22 which is adjacent the cylindrical surface 78 provided for receiving the stem flange 55 is provided as the large area seating surface. The ball 22 is loaded toward the large area seat which surrounds each of the three outlet ports by a single Belleville spring 48, which has significant advantages over prior art switch valves with a bellows design. This design allows the thickness of the spring 48 to be greater than that of the bellows design, and exotic and expensive materials for the spring are avoided. A substantial biasing force may be provided for achieving sealing between the ball and the valve body due to single biasing member design and the large seating surface area.

The valve of the present invention preferably also includes one or more purge ports for purging cavities within the interior of the valve 10. As shown in FIGS. 1 and 2, the exemplary switch valve includes a packing purge line 190, a stem purge line 194 and seat purge lines 192, each provided in the upper housing. The seat purge lines 192 provides communication to the cavity adjacent the seal 56. Three tangential purge lines 192A, 192B and 192C allow for a desired stem purge. Unlike the switch valves which use a bellows design, the design of the present invention does not rely on the presence of purge pressure to prevent the failure of the biasing spring. If purge pressure is lost, the valve will still operate with its operational life being only slightly compromised. Ideally the purge is also a positive pressure rather than a constantly flowing purge fluid. The purge thus supplies a positive pressure to prevent coke particles from entering the cavity around the bottom of the ball. As the ball 22 rotates, the cavity purge does not exhaust into the full bore of the ball extending between the inlet port 24 and the outlet port 26, thereby achieving a substantial savings in the consumption of the purge fluid, which is typically steam. This is yet another benefit of the generally dome-shaped large area seating surface 40. The valve may thus include one or more steam purge ports to optimize the life of the valve while minimizing the consumption of steam.

The design of the present invention minimizes the number of voids within the interior of the ball valve where particles may build up. As shown in FIG. 1, only one annular cavity 54 is provided, and this cavity may be periodically purged. The cavity 54 is in fluid communication with the cavities 62 and 64 as shown in FIG. 1, since as previously noted, the sealing member 56 does not provide sealing engagement with the ball 22. This design may reduce the torque required to be output by the actuator unit 30 to rotate the ball, since the likelihood of particle buildup is reduced.

A feature of the invention is that flow through the switch valve is never fully closed off, regardless of the rotational position of the ball within the valve housing. Normally fluid flows from a single one of the plurality of outlet ports. Even when the ball is rotated to change the selected discharge port from the valve, one or two of the outlet ports are at least partially exposed to the ball outlet port 26. Thus process operations upstream of the switch valve are not adversely affected as they might be if the switch valve completely closed off flow through the switch valve, even temporarily, when the ball was rotated.

As explained above, the ball 22 is loaded against a very large area of the seating surface 40 in the upper housing 14. This large seating surface is provided for continuous sealing engagement with the upper portion of the ball radially opposite the inlet port 24. The ball is thus pressed into the seating surface 40 in a manner much like a bearing in a race. This desirably allows for only rotation, not floating or side loading of the ball with respect to the seating surface 40. As the ball 22 rotates, the spring load ensures a cleaning action between the ball and the substantial sealing area 40. The force of the spring is higher than the adhesion force of the contaminant passing through the ball, so that the valve is self cleaning. Moreover, the edges 184 of the upper housing 14 which define the fluid receiving ports in the upper housing are preferably sharp and are substantially perpendicular to the outer surface of the ball at the location of ball engagement to provide a cleaning function. The edge 186 of the ball inlet port 24 may be slightly rounded since it need not provide such a cleaning function.

A particular feature of the present invention is a substantial diameter of the uniform diameter flow passageway within the ball between the ports 24 and 26 compared to the diameter of the ball 22. In accordance with the present invention, a switch valve may be provided with 8 inch ports with a ball diameter which is only 16 inches. This results in a significant cost savings with respect to the manufacture of a valve, and a corresponding benefit due to the reduced weight of the ball member which must be rotated. According to this invention, the ball diameter is preferably no greater than 2.5 times the diameter, and preferably is less than 2.2 times the diameter of the uniform flow passage way through the ball.

The ball 22 as shown in FIG. 1 desirably has a 45° (135°) flow through angle, which results in a significant savings in the pressure drop across the ball valve compared to switch type ball valves which utilize a 90° angle between the inlet port and outlet ports of the rotatable ball. The centerline 180 of the inlet passageway in the ball of the switch valve of the present invention is preferably angled at from 125 to 155° with respect to the centerline 182 of the outlet passageway in the ball. This selected angle results in a design wherein the ball diameter is substantially reduced compared to the flow passageway in the ball, while the biasing member 48 continuously provides the desired upward force for maintaining sealing engagement between the outer ball surface 38 and the seating surface 40 on the upper body 14. Also, lowering this angle below 125° would result in a higher pressure drop through the valve. If the angle between centerlines 180 and 182 were reduced below 125°, the axial load resulting from the Belleville spring may be insufficient to provide a reliable seal between the ball surface 38 and the seating surface 40. On the other hand, if this angle were increased beyond 155°, the ball diameter undesirably would have to be increased to provide for the required spacing between the upper housing outlet ports to allow fluid to flow out only the selected outlet port, while simultaneously providing the desired clearance for the seating area on the upper housing surrounding the stem. The 125° to 155° range is thus desired, with a 135° angle being preferred, to maintain a reliable seal from a single Belleville spring while also desirably minimizing the diameter of the ball.

The seating surface 40 may be machined integrally into the upper body 14 thereby substantially reducing the number of voids or passageways in which contaminants may build up within the valve. While this seating surface in the embodiment shown is formed from and homogeneous with the material of the upper housing 24, the seating surface could consist of a plurality of pressed-in or welded seats, with each seat provided for sealing about a respective outlet port. The plurality of seats together may thus still function in the manner of the integral seat design as shown in the drawings. If the seats are pressed or welded in place, they may be replaced if necessary. Even if this alternative design is used, the curved surface areas spaced circumferentially between the plurality of seats still may be spaced for engagement with sealing surfaces of the ball, thereby eliminating or at least minimnizing voids between the seats where contaminants may build up and adversely affect the operation of the switch valve. This integral seat design also allows for the seat to be hydrostatically tested as required by various codes without possibly damaging valve components. Many switch valves of the prior type are of a type which require "derating." A modification of the code standards is required to prevent damage to the valve internal components of prior art switch valves. The switch valve of the present invention may be designed for a full code rating. An extremely reliable seating surface between the exterior surfaces of the ball 22 and the seating surface 40 of the upper body 14 may be provided by mate lapping technique, wherein the surfaces are microscopically worn.

The edges of the ports 20A, 20B, and 20C which are provided for edge engagement with the ball may be angled as discussed above to provide substantially a desired scraping action between the ball and the seat. Each edge may thus be "sharpened" in a manner such that it is substantially perpendicular to the seating surface of the ball, so that ball rotation cleans the valve during rotation.

The outer surface 38 of the ball may be provided with a very hard coating to cooperate with the seating surface 40 on the upper body 14 to prevent contaminants from filling interior voids within the valve and adversely affecting a reliable seal. Various processes may be used to harden the outer surface of the ball 22. Similar technology may be used to harden the inner surface 40 of the housing 14. Suitable material hardening technology for these surfaces may include electrolytic coatings, diffused coatings, high velocity oxygen fuel (HVOF) coatings, and spray and fused coatings.

Various mechanisms may be provided for allowing the operator to easily determine the rotational position of the stem 28 with respect to the body 14, thereby informing the operator of the particular outlet port on the upper body 14 which is open to flow from the inlet port 18. An arrow or other marking may be provided on the stem for indicating a position of the ball and the corresponding outlet port which is "open" at that time. Various types of lug mechanisms may also be provided for stopping the rotation of the ball 22 with respect to the body 12 at a particular position.

While a preferred embodiment of the present invention has been illustrated in detail, it is apparent that other modifications and adaptations of the preferred embodiment will occur to those skilled in the art. It should be understood that such modifications and adaptations are within the spirit and scope of the present invention, which is defined by the following claims.

What is claimed is:

1. A valve for directing incoming fluid to a selected one of a plurality of outlets, the valve comprising:
    a valve body including a body inlet port and a plurality of body outlet ports, the valve body defining a valve seat thereon integral with the valve body and spaced circumferentially about each of the plurality of body outlet ports;
    a ball member moveable within the valve body for diverting fluid to a selective one of the plurality of body outlet ports, the ball member having a ball inlet continually in fluid communication with the body inlet port and a ball outlet for selected fluid communication with one or more of the plurality of body outlet ports;
    a valve stem rotatable with respect to the valve body for rotating the ball member within the valve body, the valve stem being opposite the inlet port with respect to a center of the ball member; and
    a biasing member adjacent the body inlet port and exerting a biasing force on the ball member for maintaining sealing engagement with the valve seat regardless of selected outlet port from the plurality of body outlet ports.

2. The valve as defined in claim 1, wherein the biasing member is a Belleville spring circumferentially surrounding the body inlet port.

3. The valve body as defined in claim 2, further comprising:
    an annular guide member spaced between the Belleville spring and the ball member for transmitting a uniform biasing force from the biasing member to the ball member, the annular guide member being spaced from engagement with the valve body.

4. The valve body as defined in claim 3, wherein the Belleville spring comprises an annular washer having an annular edge surface in circumferential engagement with the valve body and an opposing annular edge surface in circumferential engagement with the guide member, such that the annular washer at least substantially seals the body inlet port from a cavity within the valve body external of the ball member and between the valve seat and the annular guide member.

5. The valve as defined in claim 1, wherein the valve body includes at least three body outlet ports.

6. The valve as defined in claim 1, wherein each of the body outlet ports has a central outlet axis angled at from 125° to 155° relative to a central axis of the body inlet port.

7. The valve as defined in claim 1, wherein the valve body includes a knife edge adjacent at least one of the body outlet ports for sliding engagement with the ball member during rotation of the ball member relative to the valve body, the knife edge being angled at approximately 90° relative to an adjacent exterior surface of the ball member.

8. The valve as defined in claim 1, wherein a seating surface of the valve seat has a hardness of at least Rc 60.

9. The valve as defined in claim 8, wherein the seating surface in the valve seat is selected from a group consisting of an electrolytic coating, a diffused coating, an HVOF coating, and a spray and fused coating.

10. The valve as defined in claim 1, further comprising:
    a plurality of purge ports extending through the valve body for passing a purge fluid into cavities between the valve body and the ball member and between the valve stem and the ball member.

11. A valve for directing incoming fluid to a selected one of a plurality of outlets, the valve comprising:
    a valve body including a body inlet port and a plurality of body outlet ports, the valve body defining a valve seat thereon integral with the valve body and spaced circumferentially about each of the plurality of body outlet ports, each of the body outlet ports having a central outlet axis angled at from 125° to 155° relative to a central axis of the body inlet ports;
    a ball member moveable within the valve body for diverting fluid to a selective one of the plurality of body outlet ports, the ball member having a ball inlet continually in fluid communication with the body inlet port and a ball outlet for selected fluid communication with the body inlet port and ball outlet for selected fluid communication with one or more of the plurality of body outlet ports;
    a valve stem rotatable with respect to the valve body for rotating the ball member within the valve body, the valve stem being positioned radially opposite the ball inlet with respect to a center of the ball member;
    a Belleville spring circumferentially surrounding the body inlet port for biasing the ball member into sealing engagement with the valve seat regardless of the selected outlet port from the plurality of body outlet ports; and
    an annular guide member spaced between the Belleville spring and the ball member for transmitting a uniform biasing force from the biasing member to the ball member.

12. The valve as defined in claim 11, wherein the valve seat has a seating surface surrounding each of the body outlet ports and otherwise extending from a circumference spaced between the body inlet port and each of the plurality of body outlet ports to a location opposite the body inlet port for receiving the valve stem, and at least one of the body outlet ports is in fluid communication with the ball outlet regardless of the rotational position of the ball member within the valve body.

13. The valve body as defined in claim 11, wherein the Belleville spring comprises an annular washer having an annular edge surface in circumferential engagement with the valve body and an opposing annular edge surface in circumferential engagement with the guide member, such that the annular washer at least substantially seals the body inlet port from a cavity within the valve body external of the ball member and between the valve seat and the annular guide member.

14. The valve as defined in claim 11, wherein the valve body includes a knife edge adjacent at least one of the body outlet ports for sliding engagement with the ball member during rotation of the ball member relative to the valve body, the knife edge being angled at approximately 90° relative to an adjacent exterior surface of the ball member.

15. The valve as defined in claim 11, further comprising:

the valve body having at least three outlet ports each for passing fluid from the switch valve through a selected one of the at least three outlet ports as a function of the rotational position of the ball member; and the ball member has a diameter less than 2.5 times a uniform diameter of a flow path through the ball member extending between the ball inlet and the ball outlet.

16. A method of sealing a ball member moveable within a valve body of a valve having a plurality of outlets, the valve body having a body inlet port and, a plurality of body outlet ports, the ball member moveable within the valve body for diverting fluid to a selective one of the plurality of body outlet ports, the ball member having a ball inlet continually in fluid communication with one or more of the plurality of body outlet ports, and a valve stem rotatable with respect to the valve body for rotating the ball member within the valve body, the method comprising:

providing valve seat integral with the valve body and spaced circumferentially about each of the plurality of outlet ports; and positioning a biasing member circumferentially surrounding the body inlet port for biasing the ball member away from the body inlet port and toward each of the plurality of body outlet ports to seal the ball member with the valve seat and about each of the plurality of outlet ports regardless of the outlet port selected from the plurality of outlet ports.

17. The method as defined in claim 6, further comprising:

providing an annular guide member between the biasing member and the ball member for transmitting a uniform biasing force from the biasing member to the ball member.

18. The method as defined in claim 16, further comprising:

angling a central outlet axis of each of the body outlet ports at from 125° to 155° relative to a central axis of the body inlet port.

19. The method as defined in claim 16, farther comprising: powering an actuator unit to rotate the ball member within the valve body.

* * * * *

UNITED STATES PATENT AND TRADEMARK OFFICE
CERTIFICATE OF CORRECTION

PATENT NO. : 6,240,946 B1
DATED : June 5, 2001
INVENTOR(S) : Marvin E. Beasley

It is certified that error appears in the above-identified patent and that said Letters Patent is hereby corrected as shown below:

<u>Column 12,</u>
Line 12, "claim 6" should read -- claim 16 --.

Signed and Sealed this

Twenty-fifth Day of December, 2001

Attest:

Attesting Officer

JAMES E. ROGAN
*Director of the United States Patent and Trademark Office*